United States Patent [19]
Chalin

[11] Patent Number: 4,763,953
[45] Date of Patent: Aug. 16, 1988

[54] TRAILER DUMP STOP AND STABILIZER

[76] Inventor: Thomas N. Chalin, c/o Watson & Chalin Mfg., Inc., P.O. Box 1206, Rowlett, Tex. 75088

[21] Appl. No.: 1,681

[22] Filed: Jan. 9, 1987

[51] Int. Cl.⁴ .......................... B60G 11/00; B60P 1/04
[52] U.S. Cl. ..................................... 298/175; 280/704
[58] Field of Search ............. 280/704; 298/17 S, 17 B

[56] References Cited
U.S. PATENT DOCUMENTS

| | | | |
|---|---|---|---|
| 2,859,047 | 11/1958 | Easton | 280/712 |
| 3,083,059 | 3/1963 | Biszantz | 298/17 S |
| 3,640,578 | 2/1972 | Finney | 298/17 S |
| 4,576,390 | 3/1986 | Vos | 280/704 X |

Primary Examiner—Robert J. Spar
Assistant Examiner—Janice Krizek
Attorney, Agent, or Firm—Bernard A. Reiter; Mark G. Bocchetti

[57] ABSTRACT

Disclosed is a device for stabilizing an air spring dumping trailer during dumping operations. Suspension hangers are affixed to the main support frame in front of the rear axle. Arm members are pivotally connected to the hangers and extend rearward past the rear axle. An axle seat is mounted to each of the arm members and air springs are provided between the axle seats in the main support frame. The section of the arm member which cantilevers past the rear axle is provided with a chock. A second chock is mounted to the main support frame. During trailer dumping operation, the air springs are deflated allowing the first and second chocks to interact with one another thereby creating a load transfer means between the main support frame and the arm member thereby bypassing the air springs.

9 Claims, 3 Drawing Sheets

TRAILER DUMP STOP AND STABILIZER

BACKGROUND OF THE INVENTION

1. Field of the Invention

This invention relates generally to air suspension trailer dump systems and particularly to stabilizing devices therefor.

2. Brief Description of the Prior Art

Dump trailers have traditionally used conventional single point two spring suspension systems. This standard leaf spring design provides relatively good stability during dumping operations because of its inherent stiffness. However, the inherent stiffness of this design also yields the disadvantage of a choppy and uncomfortable ride.

The use of air spring suspension systems for trailers yielded a much smoother and more comfortable ride. However, because of the inherent softness of air springs, there was created a degree of load instability during dumping operations which has caused a number of trailers to overturn during such activity. This instability is created by load transfer from the trailer to the wheels through the inherently soft air springs. One means of accomplishing this in the prior art was to provide rubber spacers within the air springs thus adding firmness to the suspension system during dumping. However, although such a design did add some firmness, the instability, to a large degree was still present. Further, the addition of rubber spacers resulted in an increase in air spring failures.

Another method in the prior art for reducing instability was to provide a travel stop on the pivot arm typically used in air spring suspension systems. The pivot arm is mounted to a hanger by bushings, the hanger extending downward from the frame of the trailer. The air springs reside between the pivot arm and the frame of the trailer and the trailer axle resides in close proximity to the air springs and is attached by some means to the pivot arm. The pivot arm travel stops of the prior art were typically bumpers mounted to the frame of the trailer midway between the air springs and the bushing connecting the hanger to the pivot arm. During dumping operation, as the air spring collapsed over the load, the pivot arm would pivot upward toward the frame and would contact the bumper. This design served to increase stability during dumping operations to a large degree. However, this was not accomplished without a price. The placement of the bumper at a point intermediate to the air spring and the bushing connecting the hanger to the pivot arm resulted in the bushing absorbing a great deal of the load transferred from the trailer frame to the wheels of the trailer. Wear and tear on the bushing became greater requiring that such bushing be replaced often.

U.S. Pat. No. 2,859,047 to Easton teaches a stabilizer arrangement for a pneumatic suspension system. However, the Easton design is directed to restraining lateral movement of the air cells when the vehicle is making a sharp turn. As such, the Easton design does not teach anything structurally or functionally similar to the invention described in the present application which is directed to stabilizing an air spring suspension trailer during dumping operations.

U.S. Pat. No. 4,309,045 to Raidel teaches an air suspension assembly for heavy duty trucks. The Raidel design is directed to a paralellogram type of axle stabilization. It is not directed to removing load from the air springs during dumping operations and as such, Raidel teaches nothing structurally or functionally similar to the design of the present invention.

SUMMARY OF THE INVENTION

It is therefore an object of the invention to provide a stabilizing device for dump trailers with air spring suspension systems.

It is a further object of the present invention to provide greater distribution of load across the rear pivot arm of the trailer.

Another object of the present invention is to provide a travel stop design which prevents excess wear and stress of the bushings connecting the pivot arm to the hanger.

Yet another object of the present invention is to provide a stabilizing device which by-passes any load transfer through the air springs during dumping operations.

Briefly stated, the foregoing and numerous other objects and advantages of the present invention are accomplished by extending the rear pivot arm rearward such that it extends past the rear axle of the trailer thus creating a cantilevered section. An arm stop is mounted to such cantilevered section. The arm stop interacts with a saddle during dumping of the trailer, the saddle being mounted to the frame.

As the trailer is placed in its lifting mode, the air springs are deflated thus causing the pivot arms to pivot upward. This action reduces the instability created by the air springs over the rear axle in the dumping mode.

If the trailer is equipped with lift air springs, they would be inflated at this time. Lift air springs are typically mounted to the frame and have chains extending downward therefrom attaching to the pivot arms. As the lift air spring inflates, the chain aids in drawing the frame and pivot arm toward one another in a pivoting action thus allowing the arm stop and the saddle to engage one another solidly. This pivot action will occur primarily as a result of the weight of the trailer and is not dependent upon lift air springs being present.

When the trailer is placed in its lifting mode and the saddle engages the arm stop, the trailer pivots about the rear axle and no load is placed on the deflated air springs resulting in the elimination of that point of instability. Further, because the arm stop is on the cantilevered portion of the pivot arm, the total forces exerted on the pivot arm are better distributed. Thus, the forces seen by the bushings at the connection of the hanger and pivot arm are substantially lessened, thereby achieving a bushing connection which is subjected to substantially less stress and therefore, will be substantially longer lived.

DESCRIPTION OF THE PREFERRED EMBODIMENT

Figure 1:
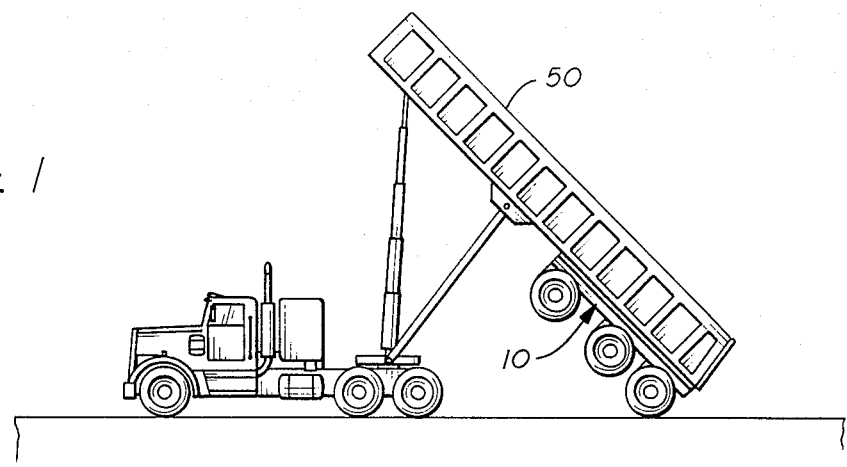
FIG. 1 is a side elevation of a trailer shown as it is being lifted for dumping, the axis of rotation coinciding with the center axis of the rear most wheel axle.
Figure 2:
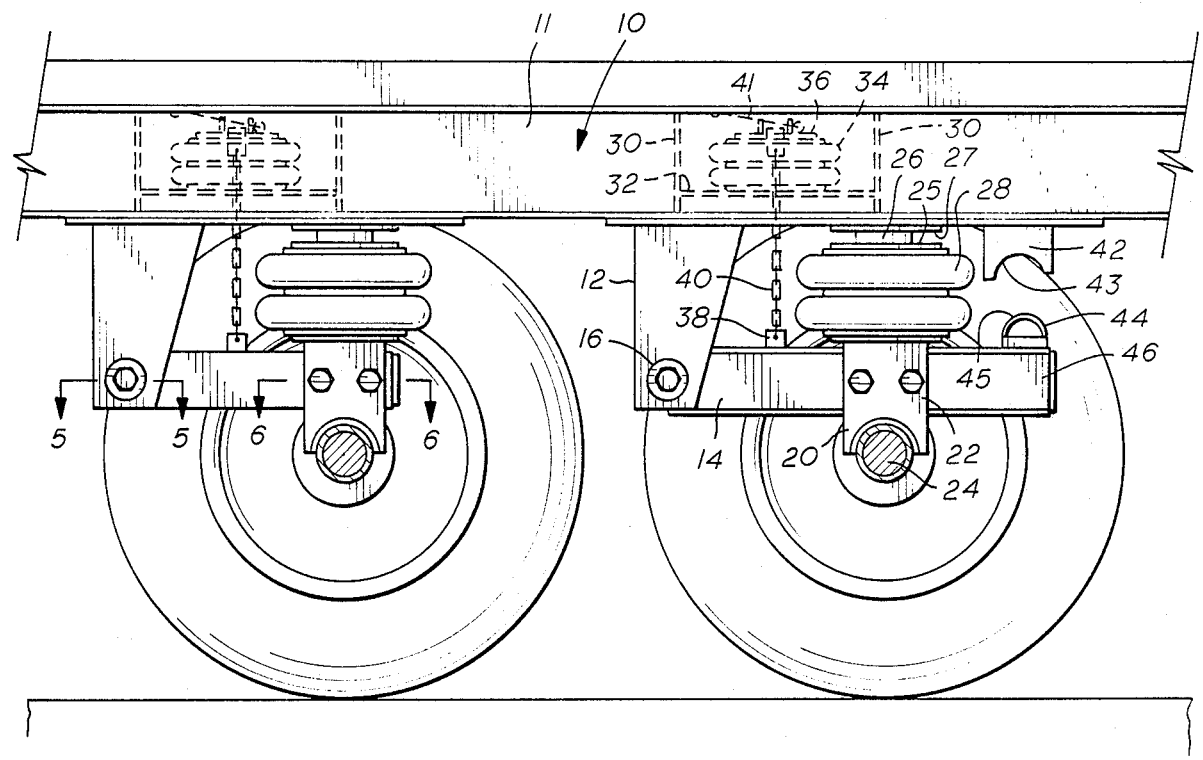
FIG. 2 is a side elevation detailing the components of the pivot stop of the present invention with suspension set for transportation of the trailer.
Figure 3:
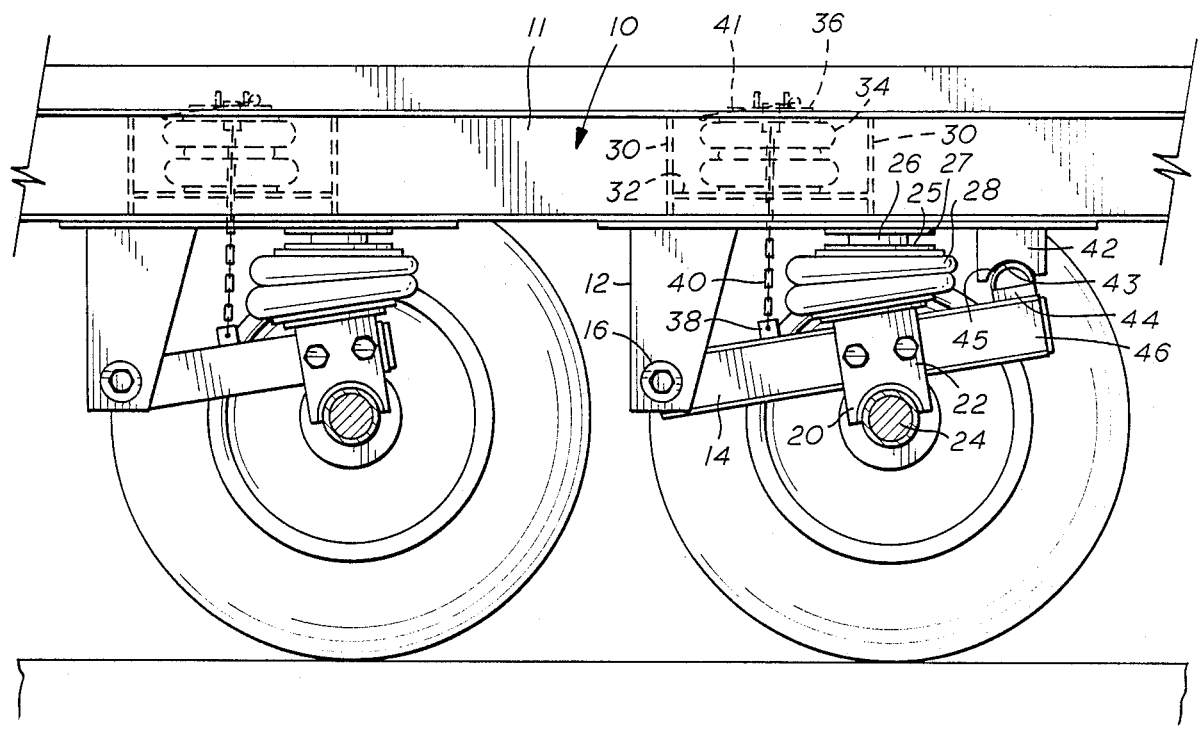
FIG. 3 is a side elevation similar to FIG. 2, but with suspension disengaged and pivot stop set for lifting of the trailer as required for the dumping operation.

Turning first to FIGS. 2 and 3 there is shown a side elevation of a trailer frame 10. Frame 10 is intended to be affixed to the base of a trailer 50 as shown in FIG. 1.

Figure 5:
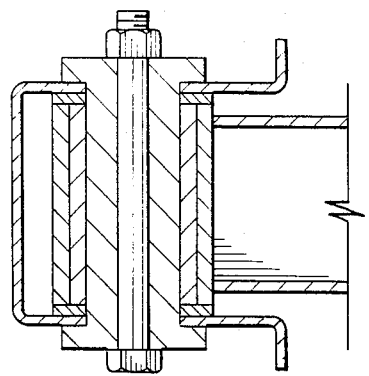
FIG. 5 is a cross sectional view of a typical pivot bushing connection as taken along line 5—5 of FIG. 2.
Figure 6:
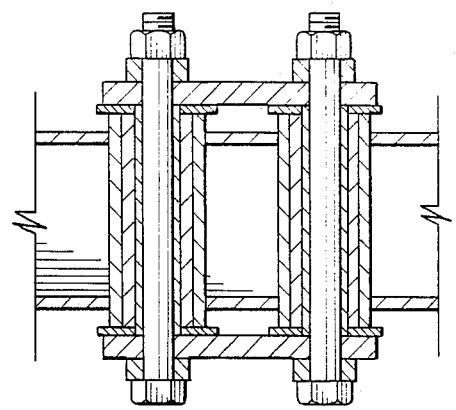
FIG. 6 is a cross sectional view of a typical axle seat bushing connection as taken along line 6—6 of FIG. 2

Extending downward from frame 10 are hangers 12. Hangers 12 are pivotally connected to arms 14 by means of pivot bushing connection 16 shown in detail in FIG. 5. Arm 14 is connected to axle seat 20 by means of bushings 22, shown in detail in FIG. 6. Axle seat 20 rests on axle 24.

Mounted to main members 11 of frame 10 immediately above axle 24 is top plate 25, spacer assembly 26 and mounting plate 27. The inclusion of spacer assembly 26 is optional. Mounted between top plate 25 and axle seat 20 is air spring 28. Air spring 28 provides an adjustable suspension means for the trailer.

Cross-members 30 extend between the main members 11 of frame 10. Lift bag support channel 32 extends between cross-members 30 substantially parallel to main member 11. Lift air spring 34 is mounted to channel member 32. Lift saddle 36 resides on top of lift air spring 34. Mounted to each pivot arm 14 is a lifting eye 38 and extending downward from lift saddle 36 are half inch chains 40 which are attached to lifting eyes 38.

Pivotally mounted to rear cross-member 30 is lift air spring stabilizer bars 41 which extend forward and pivotally connects to lift saddle 36. Lift stabilizer bars 41 ensure the vertical stability of lift air spring 34.

In a trailer dumping operation, as the trailer is pivoted upward the axis of rotation becomes axle 24. Air springs 38 are deflated and lift air spring 34 is inflated.

The trailer may optionally have included lift air spring 34. If included, as lift air spring 34 inflates, chain 40 aids in drawing main members 11 and pivot arms 14 toward one another. Surface 43 of saddle or chock 42 which is attached to main member 11 is preferably concave and solidly interacts with arm stop 44. Arm stop or chock 44 preferably has a convex surface 45 and is mounted to the top of the cantilever section 46 of pivot arm 14. Pivot arm 14 extends rearward from hanger 12 beyond axle 24 thereby creating cantilever section 46. The interaction of saddle or chock 42 with arm stop or chock 44 substantially removes the potential for any load to be transferred through air spring 28 thus removing the potential for trailer instability during dumping operations if the load is still supported in any way by air springs 28.

It should be understood that the solid interaction of saddle or chock 42 with arm stop 44 will occur regardless of whether lift air apring 34 is present. The weight of the trailer and the deflation of air springs 28 will promote the desired pivotal movement and interaction.

The cantilevered section 46 of pivot arm 14 also allows a more favorable distribution of load resulting in longer life and less wear to bushings 16. By way of example, if a 40,000 pound load is transmitted through pivot arm 14 to axle 24, assuming static conditions and assuming that axle 24 is substantially midway between bushing 16 and arm stop 44, by summing the moments about arm stop 44 it is seen that the load transferred through bushing 16 is 20,000 pounds. Compare this to similar load conditions of the system typically encountered in the prior art where the travel stop is located substantially midway between bushing 16 and axle 24. Again, assuming static conditions and that the load transferred through pivot arm 14 to axle 24 is 40,000 pounds, the sum of the moments about the travel stop of the prior art yields a load of 40,000 pounds on bushing 16. Thus the present invention, beside ensuring greater stability during dumping operation, also substantially lessens the stress on bushing 16. The net result of this is less wear and tear on bushing 16 the consequence of which is the longer life of bushing 16.

It should be noted that FIGS. 2 and 3 depict a dual axle system. Because, during dumping operations, the pivot point of the trailer is the rear axle only, the cantilever section 46, saddle 42 and arm stop 44 of the present invention need only be added to that portion of the suspension system for the rear axle. All other axles and their accompanying tires will be suspended off the ground and no load will be transferred through their respective air springs.

Figure 4:
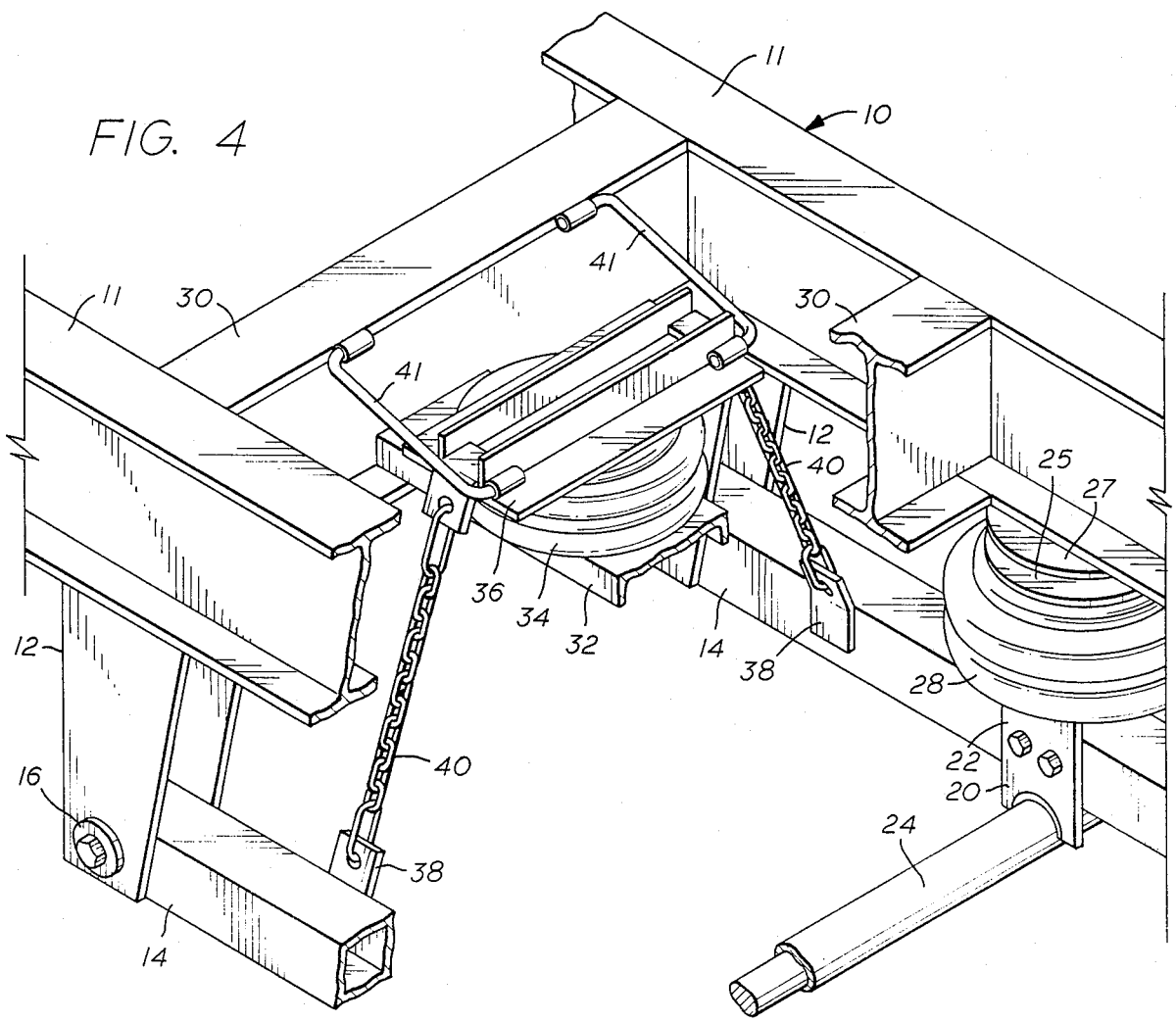
FIG. 4 is perspective view detailing the pivot arms, air springs and most of the lift air spring assembly.

It should be recognized that although the invention as depicted in FIGS. 2, 3 and 4 describe pivot arm 14, bushings 16, cantilever section 46 and other accompanying parts in the singular, there are corresponding parts on each side of the trailer suspension system.

From the foregoing, it will be seen that this invention is one well adapted to obtain all of the ends and objects hereinabove set forth, together with other advantages which are obvious and which are inherent to the device.

It is to be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth shown in the accompanying drawings is to be interpreted as illustrative and not in a limiting sense.

What is claimed is:

1. A pivot stop for a dumping trailer comprising:
    (a) a plurality of primary frame members;
    (b) a hanger extending downward from each of said primary frame members;
    (c) an arm pivotally connected to each of said hangers;
    (d) an axle seat attached to each of said arms;
    (e) a set of air springs extending between said axle seats and said primary frame members;
    (f) a cantilever section of each of said arms extending beyond said axle seats;
    (g) a plurality of chocks mounted to and extending downward from said primary frame members for contacting each of said cantilever sections of said arms and for transferring load from said primary frame members to said arms during dumping operations.

2. An air spring suspension dump trailer stabilizing device comprising:
    (a) a support frame to which the trailer is mounted;
    (b) a plurality of hangers connected to said support frame;
    (c) an arm member pivotally connected to each of said hangers;
    (d) an axle seat affixed to each of said arm members;
    (e) air springs extending from said axle seats to said support frame;
    (f) load transfer means affixed to a cantilever section of said arm members, said load transfer means serving to transfer load from said support frame to said arm members during dumping operations.

3. A device for stabilizing air spring suspension trailers during dumping operations as recited in claim 2 further comprising:
(a) a lift air spring mounted to said support frame;
(b) a lift saddle residing on top of said air spring;
(c) a chain affixed at a first end to said lift saddle and at a second end to said arm member.

4. A device for stabilizing an air spring suspension dump trailer during dumping operation as recited in claim 2 wherein said load transfer means is a travel stop for said arm members preventing further upward rotational movement of said arm members.

5. A device for stabilizing air spring suspension dump trailers during dumping operations as recited in claim 2 wherein said load transfer means comprises a first chock mounted to each of said arm members and a second corresponding chock attached to said support frame.

6. A device for stabilizing an air spring suspension dump trailer during dumping operations as recited in claim 5, wherein said first and second chocks have mating surfaces.

7. A device for stabilizing an air spring suspension dump trailer during dumping operations as recited in claim 5, wherein said first chock has a convex surface and said second chock has a concave surface, said convex surface mating with said concave surface during dumping operations.

8. A device for stabilizing an air spring suspension dump trailer during dumping operations as recited in claim 5, wherein said first chock has a concave surface and said second chock has a convex surface, said convex surface mating with said concave surface during dumping operations.

9. A device for stabilizing an air spring suspension dump trailer during dumping operations comprising:
(a) a support frame;
(b) a plurality of axle seats;
(c) a plurality of air springs extending from said support frame to said axle seats;
(d) a plurality of hangers affixed to said support frames;
(e) a plurality of arm members have proximal and distal ends, said proximal end of each of said arm members being pivotally connected to said hangers with said axle seats being connected to said arm members between said proximal and distal ends;
(f) a first set of chocks mounted to said arm members between said axle seats and said distal ends;
(g) a second set of chocks affixed to said support frame, said first set of chocks contacting said second set of chocks during dumping operations.

* * * * *